UNITED STATES PATENT OFFICE.

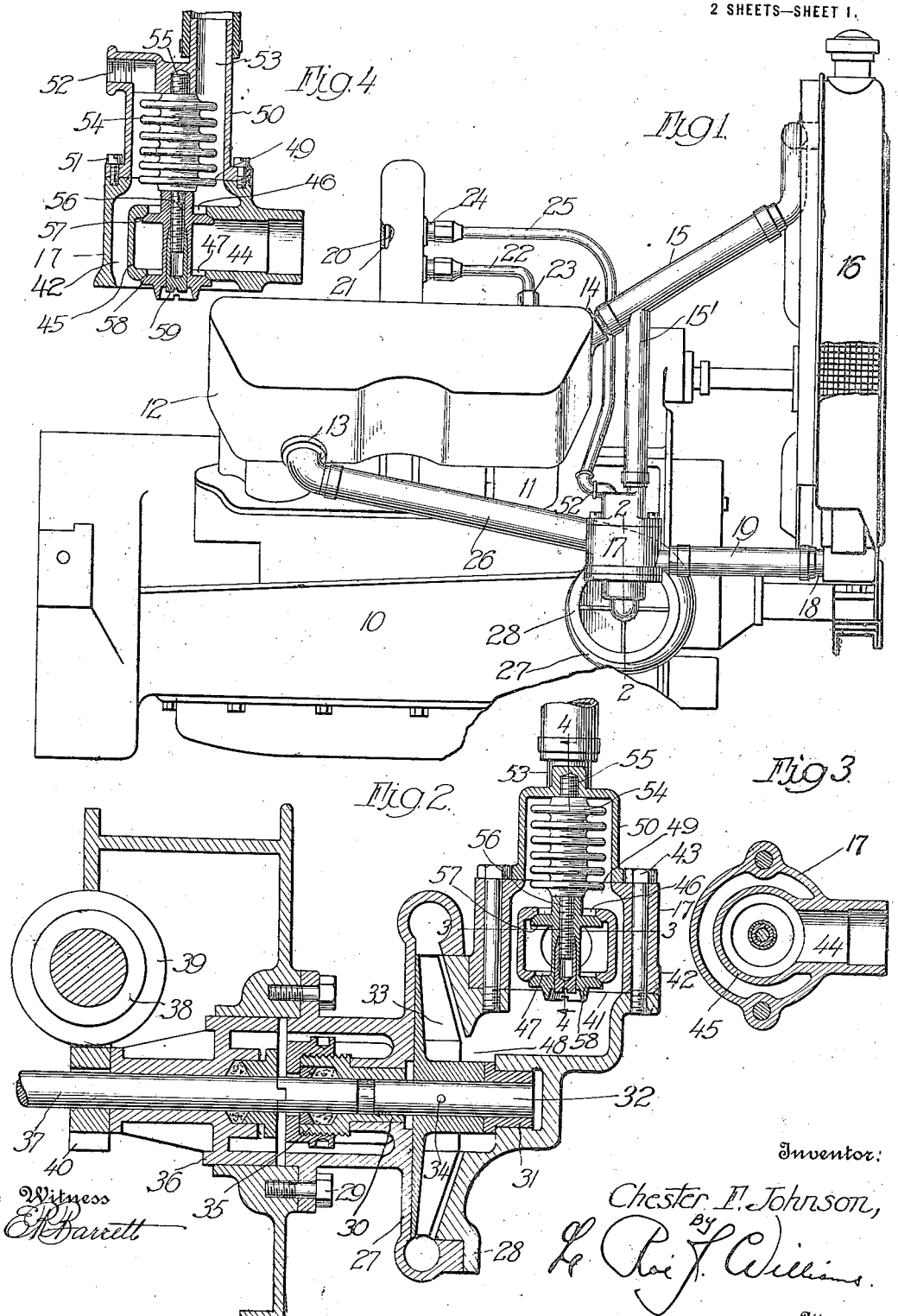

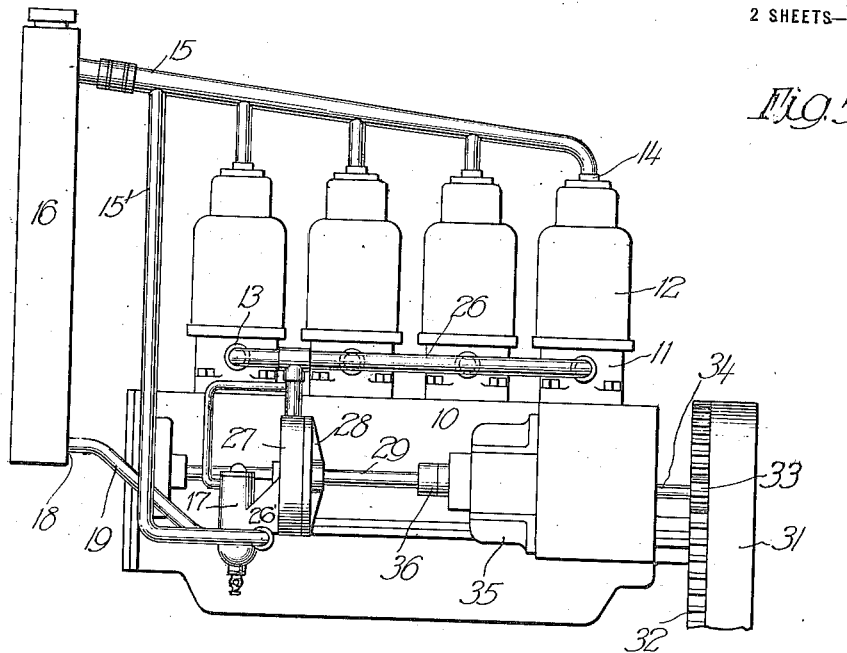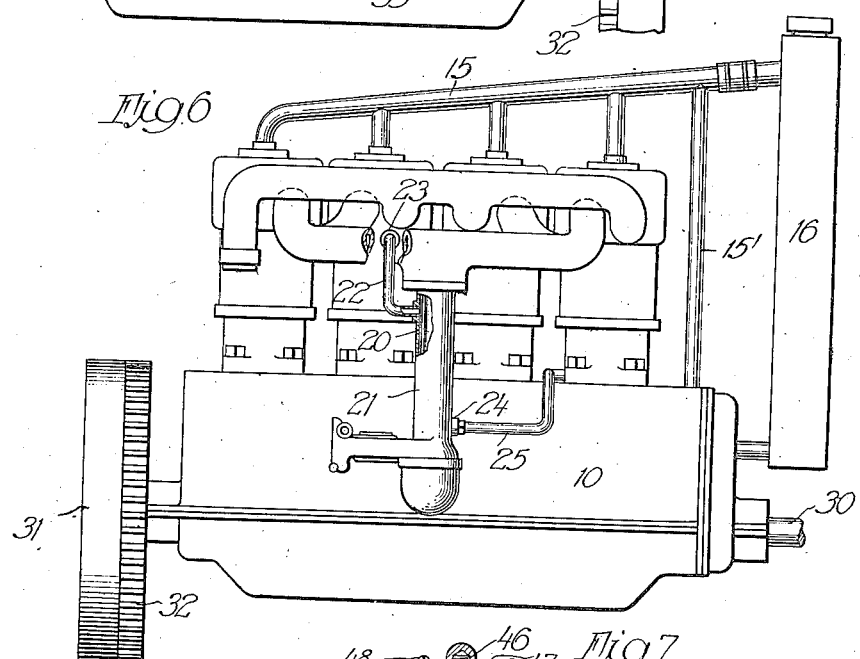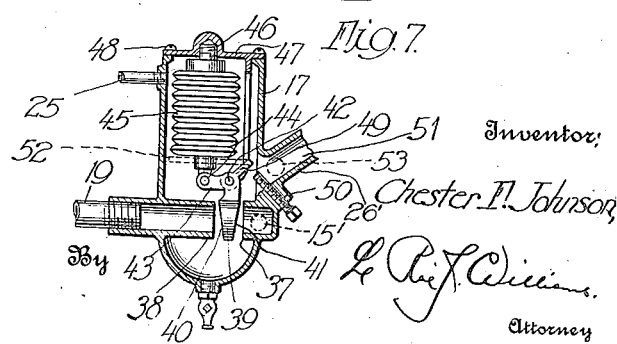

CHESTER F. JOHNSON, OF DETROIT, MICHIGAN, ASSIGNOR TO CADILLAC MOTOR CAR COMPANY, OF DETROIT, MICHIGAN, A CORPORATION OF MICHIGAN.

HYDROCARBON-MOTOR.

1,232,041.  Specification of Letters Patent.  Patented July 3, 1917.

Application filed January 5, 1916. Serial No. 70,354.

*To all whom it may concern:*

Be it known that I, CHESTER F. JOHNSON, a citizen of the United States, and resident of Detroit, Wayne county, State of Michigan, have invented certain new and useful Improvements in Hydrocarbon-Motors, of which the following is a specification.

This invention relates to hydrocarbon motors and particularly to circulating cooling systems which may be easily applied thereto.

In prior internal combustion engines employing circulating cooling systems adapted to be thermostatically controlled, two general arrangements of regulating devices have been proposed—one has its valve mechanism and actuating thermostat located on the discharge side of the pump, the arrangement being to locate the valve mechanism and its thermostat in the path of the cooling medium as it leaves the cylinder jackets. With this arrangement, the operation of the valve mechanism has been frequently found unsatisfactory, for the reason that when the thermostat contracts, tending to close the valve mechanism, its action must necessarily be in opposition to the pressure set up by the pump; on the other hand, the opening action of the thermostat is entirely too quick because the thermostat is aided by the pressure set up by the pump mechanism. With this arrangement, the thermostat is, of course, actuated by the temperature of the cooling medium flowing from the cylinder jackets. While it is sometimes very desirable to actuate the thermostat by the temperature of the water flowing from the jacket, thus permitting the maintenance of a predetermined maximum temperature of the cooling medium as it leaves the jacket, while at the same time permitting the cooling medium to enter the jacket under varying temperatures, depending upon the operating conditions, prior systems have not produced this satisfactory result without the attendant disadvantages resulting from the location of the valve mechanism in the jacket outlet.

Another arrangement is to locate the valve mechanism on the suction side of the pump, which has been found very desirable because the valve mechanism may close easily, being only opposed by the action of whatever vacuum is created by the pump mechanism. With such constructions, it has been proposed to arrange the thermostat so that it is actuated by the temperature of the cooling medium as it passes over the valve mechanism; that is, in such a system, the thermostat is controlled by the temperature of the water flowing to the jackets, which is, of course, much lower than that flowing from the jackets, except when the motor is operating at a low speed, while at the same time under heavy load.

With the latter arrangement, the temperature of the cooling medium, as it enters the jacket, will be maintained at a substantially uniform temperature, which will result in a variable temperature of the cooling medium as it leaves the jacket under variable operating conditions and, of course, with this arrangement, it is necessary that the temperature of the cooling medium be maintained at a sufficiently low temperature, so that when the motor is operating under extreme conditions; that is, such as when under a heavy load, the temperature of the cooling medium as it leaves the jacket will not be above the desired maximum. It will thus be seen that when the motor is running under idling, or light load conditions, the temperature of the cooling medium as it enters the jacket being maintained constant, the cooling medium, as it leaves the jacket will be of a temperature much lower than that conducive to maximum efficiency.

To obviate these and other difficulties, and at the same time, to enjoy all the advantages accruing to both systems, I have provided a valve mechanism arranged on the suction side of the pump mechanism, and adapted to be operated by a thermostat, actuated by the temperature of the cooling medium as it leaves the jacket, thus maintaining a constant maximum temperature of the cooling medium, and permitting a variable minimum temperature.

Therefore, one of the objects of this invention is to improve circulating systems in general and particularly cooling systems, as applied to internal combustion engines, where it is desired to maintain the cooling medium at a substantially uniform temperature under variable conditions.

Another object is to provide a double path circulating cooling system for internal combustion engines with improved means for maintaining the temperature of the cooling medium at a substantially uniform temperature when it leaves the cylinder jackets, while permitting the cooling medium to be fed into the jackets under varying temperatures, depending upon operating conditions.

These, and other objects, will appear from the following description, taken in connection with the accompanying drawings, which form a part of this specification, and in which:

Figure 1 is a side elevation, with portions broken away, of a power plant embodying a preferred form of this invention;

Fig. 2 is an enlarged vertical sectional view, substantially on the line 2—2 of Fig. 1, through the circulating and regulating mechanism, also showing the driving mechanism for the pump;

Fig. 3 is a transverse section substantially on the line 3—3 of Fig. 2;

Fig. 4 is a vertical section through the valve mechanism, substantially on the line 4—4 of Fig. 2;

Fig. 5 is a side elevation of another power plant, showing a modified form of this invention;

Fig. 6 is an opposite side elevation of the power plant shown in Fig. 5, with portions broken away; and Fig. 7 is a vertical longitudinal section through the regulating mechanism, illustrated in Fig. 5.

Referring to the drawings, particularly to Figs. 1 to 4 inclusive, 10 represents a crank case and 11 one of a plurality of cylinder blocks, mounted thereon, in any suitable manner. While this invention may be applied to a cooling system, the medium of which is adapted to circulate in series through all of the cylinder blocks of the motor, a description of the cooling system, as applied to one block only is deemed sufficient for a clear understanding of the invention, therefore, this description will be so confined.

The cylinder block 11 is provided with the usual jacket 12, having an intake 13, which may be arranged adjacent one end thereof, if desired. An outlet port 14 may be provided adjacent the opposite end of the cylinder block. This outlet port may then be connected, as shown, by means of a flexible branched conduit 15 and 15' to a radiator 16 and valve, or liquid chamber casing 17, respectively. It will be noted that the branch 15' of the flexible conduit forms a bypass around the radiator 16. The radiator may be provided adjacent its bottom with a port 18, connected by means of a flexible conduit 19 to the chamber casing.

It will also be noted that a gas intake 20 is provided with a water jacket 21, to which water may be circulated by a conduit 22 leading from the upper part of the cylinder jacket, as at 23. A discharge port 24 is formed in the gas intake jacket, and may be connected with the casing 17, as by the conduit 25, as will be more particularly described hereinafter; however it will be noted that the conduits 22, 25 and the water jacket 21 for the gas intake 20 form another bypass return around the radiator 16.

While the pump mechanism and the automatic control, which will be more particularly described hereinafter, are shown as arranged between the connections 15', 19 and an intake conduit 26, it is not essential that such mechanism be included in this system, as it will be clearly understood this invention is applicable to thermo siphon systems, or systems adapted to be manually controlled. The pump mechanism and automatic control, which have been provided for the illustrated force feed circulating system, may comprise a pump of the well known centrifugal type, comprising a pump chamber or casing, consisting of members 27 and 28, which may be suitably secured together and mounted on the crank case 10, as by bolts 29. Suitably arranged in bearings 30 and 31 in said casing is a pump shaft 32 for an impeller 33, secured thereon, as by a pin 34. A suitable packing box 35 may be provided in the casing member 27 for making the same water tight at its inside. Also arranged in the crank case 10, at opposite sides thereof, may be bearings 36 for supporting the pump driving shaft 37, which is arranged transversely to the motor crank shaft 38 and connected thereto for being driven therefrom, as by spiral gears 39 and 40. The casing member 28 is provided, adjacent its upper portion, with an opening 41, over which is arranged a cover, forming a valve or liquid chamber 42, which is secured to the pump chamber, as by bolts 43. The chamber 42, it will be seen, is provided adjacent its lower end, with a laterally extending inlet port 44, which is adapted to communicate with the conduit 19, as hereinabove described. It will be noted that the port 44 communicates with an inner shell 45, shown as formed integral with the chamber, this shell being provided with openings, or intake ports 46 and 47, leading to the discharge port 48 or suction intake of the pump mechanism, and these ports are adapted to be controlled by a valve mechanism, which will now be more particularly described.

It will be seen that the chamber 42 is provided at its upper side with an opening 49, over which is arranged a cover 50, which is suitably secured in position, as by bolts 51.

It will be noted that this cover plate 50 is provided with a plurality of ports 52 and 53, respectively, the port 52 being adapted to communicate with the conduit or bypass 25 and the port 53 having the conduit or bypass 15' connected thereto. A thermostat 54 is provided at its upper end with a threaded stem 55, adapted to be detachably secured to the upper portion of the cover 50. The lower, or opposite end of the thermostat is provided with a similar threaded stem 56, on which may be arranged upper and lower valve members 57 and 58, which may be adjustably secured in position by means of a tapered pin 59, which may be threaded on the stem 56; the upper and lower valve members 57 and 58 respectively, forming a balanced valve mechanism for controlling the flow of cooling medium from the conduit 19.

It will be noted from the above description, that the valve mechanism, shown in Figs. 1 to 4 inclusive, is adapted to control the passage of water only through the conduit 19 and that there is a constant flow of water from the hottest part of the cylinder jacket, through the bypasses 15' and 25, respectively, over the thermostat 54, so that the thermostat is always actuated by the temperature of this hot water.

It will be understood from the foregoing description that assuming the motor to be started when the cooling medium is below the desired temperature, the thermostat 54 will be contracted, bringing the valve members 57 and 58 over their respective ports 46 and 47, thus the communication of the port 44 with the interior of the chamber 42, or the discharge port 48 therein, will be cut off and the cooling medium will be drawn in the pump through the bypasses 15' and 25, respectively. The cooling medium will then be discharged from the pump, through the conduit 26 to the cylinder jacket at 13, through the jacket and discharging it therefrom at the outlet ports 14 and 23, respectively, thence to the bypasses. On the other hand, when the temperature of the cooling medium leaving the cylinder jacket rises above a predetermined degree, the thermostat 54 expands, thus opening the valve mechanism and permitting the water to enter the chamber 42 through the port 44, so that a greater portion of the circulating medium tends to flow through the radiator 16, bringing the temperature of the cooling medium to the desired point.

Referring particularly to the modified form shown in Figs. 5, 6 and 7, the usual crank case is illustrated at 10 and a plurality of cylinder blocks 11 are vertically arranged thereon, and provided with the usual jackets 12. These jackets are provided adjacent their lower ends with intake ports 13, and are also provided adjacent their upper ends with discharge ports 14, which may be connected by means of a flexible branched conduit 15 and 15', to a radiator 16 and the lower part of a valve or liquid chamber casing 17. The radiator 16 may be provided adjacent its bottom with a port 18, connected by means of a flexible conduit 19 with the lower part of the chamber casing 17. It will also be noted that a gas intake 20 is provided with a water jacket 21, to which water may be circulated by a conduit 22 from the upper part of the cylinder jacket, as at 23. A discharge port 24 is formed in the gas intake jacket and may be connected with the upper part of the casing 17, as by a conduit 25.

It will be noted that a pump intake conduit 26' is connected with a pump mechanism, which may be of the usual centrifugal type, comprising casing members 27 and 28. The pump mechanism is provided with a driving shaft 29, which is adapted to be driven, in any well known manner, through gears, not shown, arranged at the front end of the motor, connecting it with the crank shaft 30. The rear end of the crank shaft 30 has the usual fly wheel 31 arranged thereon, provided with a gear 32, with which a gear 33, arranged on a shaft 34 is adapted to mesh, the shaft 34 being adapted to be shifted, in any well known manner, to bring the gear 33 in and out of mesh with the gear 32, and being adapted to be driven from the usual combined starting motor and generator 35. The usual automatic clutch 36 is provided between the shafts 29 and 34, whereby the latter is also adapted to be driven by the former when the gear 33 is not in mesh with the gear 32 on the fly wheel for driving same.

It will be noted that the casing 17 is provided with two oppositely arranged ports 37 and 38, leading from the bypass 15' and the conduit 19, respectively. Between the ports 37 and 38 is arranged a valve member 39, having oppositely inclined faces 40 and 41, adapted to fit against the seats 37 and 38, alternately, when the valve is in either of its extreme positions. The valve member 39 is adapted to be pivotally mounted, as at 42, on the cover 47, and is provided with a bell crank 43 pivotally connected, as at 44, with the lower end of a thermostat member 45, of any well known form, which is detachably secured, as at 46, to the chamber casing cover 47. It will be noted that the cover 47 is detachably connected, as by bolts 48, to the casing 17, and that the thermostat and valve mechanism are adapted to be mounted as a unit on the cover, to be assembled in and disassembled from the casing 17 as a unit. The valve member 39 is provided with an arm 49, against which an adjustable bolt 50 is adapted to abut for lifting the valve member from the seat 38, upon failure of the thermostat member 45 to act. It will be understood that the casing 17 may be formed integral with the pump casing member 27 and is in communication with the interior thereof, as by the intake 51, which leads into the casing 17, adjacent its bottom portion.

Having described the construction and arrangement of the parts used in the modified form of the invention, the operation of this form will be understood as follows: Assuming the motor to be started when the cooling medium is below the desired temperature, the thermostat member 45 will be contracted, thus closing off the communication of the port 38 and the conduit 19 with the chamber 17, and the cooling medium will be drawn in the chamber through the port 37 from the bypass 15', and from the bypass 25, respectively, thence through the discharge port 51 to the pump and from the pump through the conduit 26 to the cylinder jackets at 13, through the jackets in parallel and discharging it therefrom at the outlets 14, and returned to the chamber, as described. It will be understood that as the thermostat 45 is arranged in the upper part of the chamber, it will, at all times be actuated by the temperature of the water flowing from the hottest part of the jackets 12, through the bypass circuits, comprising conduit 22, jacket 21 and conduit 25. It has been found, from practical use of this construction, that under normal operation, the temperature of the water flowing through the conduit 25, and which controls the action of the thermostat, is not materially lower than the water taken from the top of the cylinder jackets, the gas flowing through the intake 20 not cooling the water, flowing thereover, to a great extent.

When the temperature of the cooling medium rises above a predetermined degree, the thermostat 45 expands, gradually moving toward the seat 37, and away from the port 38, until the latter is fully opened, and the former is entirely closed. With the valve mechanism in this position, a large body of the cooling medium will circulate from the pump, through the same circuit as when the valve mechanism was in the other described position, until the water is discharged from the cylinder jacket outlet 14, when it will continue to flow through the radiator 16, instead of through the bypass 15', returning to the chamber 17 by means of the conduit 19. Of course, with the valve mechanism in this position, the thermostat will still be controlled by the hottest water in the valve chamber. It will be understood that instead of conducting water from the hottest part of the cylinder jacket, through the conduit 22 to the gas intake jacket 21, it may be fed directly from the conduit 22 to the upper part of the casing 17, as shown particularly in Fig. 7, and to prevent any of the cool water which enters the bottom of the casing from tempering the water which flows over the thermostat from the conduit 25, a partition or baffle 52 may be arranged on the stem of the thermostat 45, as shown in dotted lines in Fig. 7, or if desired, a permanent partition might be arranged in the casing 17, and if desired, another bypass forming a jacket for the gas intake might be led into the intake 51, as shown in dotted lines at 53 in Fig. 7.

While I have described and illustrated what I believe to be the preferred embodiments of my invention, it will, of course, be understood that various modifications and changes may be made, by those skilled in the art, without departing from the spirit and scope thereof.

Having thus described my invention, what I claim and desire to secure by Letters Patent is:

1. The combination with the cylinder of an internal combustion engine, and a cooling jacket therefor, of a pump for supplying cooling fluid to the jacket, a plurality of conduits for returning the cooling fluid from the jacket to the pump, a valve device located between the return conduits and the pump and constructed to positively control the flow of fluid through either of said return conduits, and a thermostat adapted to actuate said valve device, said thermostat being so arranged that it is adapted to be constantly actuated by water substantially the same temperature as that flowing from the jacket.

2. The combination with a cylinder of an internal combustion engine, and a cooling jacket therefor, of a pump for supplying cooling fluid to the jacket, two conduits for returning the cooling fluid from the jacket to the pump, one of said conduits including a radiator, and means for controlling the flow of fluid through one of said return conduits, comprising a vertically arranged liquid chamber, provided adjacent its lower end with an inlet port communicating with the return from said radiator, and with a discharge port to said pump, said chamber also being provided adjacent its upper end with an intake port communicating with said other return, and a thermostat arranged in said chamber whereby it is adapted to be actuated by the temperature of the water flowing from the upper port.

3. A cooling system for internal combustion engines, comprising an engine cylinder, and a water jacket therefor, a radiator, a pipe for conducting cooling fluid from the jacket to the radiator, a thermostatically controlled valve, a pipe for conducting cooling liquid from the radiator to said valve, a second pipe for conducting cooling liquid from the water jacket to the valve, independently of the radiator, and means for conducting the cooling liquid from the valve to the engine, said valve being adapted to positively direct the cooling liquid entirely through either of said pipes, or partially through both, said thermostat being so arranged that it is adapted to be constantly actuated by the temperature of the water as it leaves said jacket.

4. The combination with a cylinder of an internal combustion engine and a cooling jacket therefor, and a pump for supplying cooling fluid to the jacket, two conduits for returning the cooling fluid from the jacket to the pump, valve means arranged between said conduits and said pump for directing the flow of water therethrough, and a thermostat for controlling said valve means, said thermostat being so arranged that it is adapted to be constantly actuated by the temperature of the water as it leaves said jacket.

5. A cooling system for an internal combustion engine, comprising an engine cylinder, and a water jacket therefor, of a pump for supplying cooling fluid to the jacket, two conduits for returning the cooling fluid from the jacket to the pump, one of said conduits including a radiator, the other of said conduits comprising a bypass around said radiator, valve means between said returns and said pump, adapted to control the flow of fluid through said returns, and a thermostat for controlling said valve means so arranged that it is adapted to be controlled by the temperature of the water flowing through said bypass, regardless of the position of said valve means.

6. The combination with a cylinder of an internal combustion engine, and a cooling jacket therefor, of a pump for supplying cooling fluid to the jacket, two conduits for returning the cooling fluid from the jacket to the pump, one of said conduits including a radiator, and means for controlling the flow of fluid through one of said return conduits, comprising a vertically arranged liquid chamber, provided adjacent its lower end with an inlet port communicating with the return from said radiator, and with a discharge port to said pump, said chamber also being provided adjacent its upper end with an intake port communicating with said other return, and a thermostat arranged in said chamber whereby it is adapted to be actuated by the temperature of the water flowing from the upper port.

7. In an internal combustion engine, the combination with a cylinder, and a jacket therefor, having an intake port and an outlet port, of a pump, a connection between the pump and the jacket intake, a connection between the jacket outlet and the pump, a valve mechanism for controlling the flow of liquid to said pump, and a thermostat for said valve mechanism arranged whereby it is constantly controlled by the temperature of the liquid flowing from said jacket.

8. In an internal combustion engine, the combination with a cylinder and a jacket therefor, having an intake port and an outlet port, means connecting said ports comprising a plurality of circulating paths and a valve mechanism controlling the flow of liquid from said paths to said jacket, and a thermostat for said valve mechanism arranged whereby it is adapted to be constantly actuated by the temperature of the liquid flowing from said jacket.

9. In a hydrocarbon motor, the combination with a cylinder block, a cooling jacket therefor, of a pump for supplying cooling fluid to the jacket, a plurality of conduits for returning the cooling fluid from the jacket to the pump, a liquid chamber arranged between said returns and the pump, a valve mechanism in said chamber, adapted to control the flow of liquid to said pump, and a thermostat for said valve mechanism arranged in said chamber and adapted to be constantly actuated by the temperature of the liquid flowing from said jackets.

10. In a hydrocarbon motor, the combination with a cylinder block, a cooling jacket therefor, of a pump for supplying cooling fluid to the jacket, a plurality of conduits for returning the cooling fluid from the jacket to the pump, valve means arranged between said conduits and said pump for controlling the flow of water through one of said conduits, and a thermostat for said valve means adapted to be constantly actuated by the temperature of the liquid in said other bypass.

11. In a liquid chamber having a plurality of inlet ports, and a discharge port, a balanced valve for controlling the flow of liquid through one only of said ports, and automatic means arranged between one of said inlet ports and said discharge port, and adapted to operate said valve.

12. In a liquid chamber provided with an inlet port, arranged in its upper portion, and another inlet port arranged in a side portion, said chamber also having a discharge port formed therein, of a balanced valve for controlling the flow of liquid through one of said inlet ports, and a thermostat arranged between the first said port and said discharge port.

13. In a liquid chamber provided with a plurality of inlet ports, one of which is adapted to permit the entrance of liquid of relatively high temperature, and the other of which is adapted to permit the entrance of water of low temperature, and a discharge port also formed therein, the combination with valve means for controlling one only of said ports, of thermostatically actuated means for operating said valve means, said thermostatically actuated means being arranged between said hot water inlet port only and the discharge port, whereby it is adapted to be actuated by the temperature of said hot water flowing therein.

14. In a hydrocarbon motor, the combination with a cylinder block, a water jacket therefor, provided with a port, a plurality of conduits adapted to have connections with said port, of a regulator adapted to control the circulation through said conduits comprising a casing having a plurality of inlet ports arranged adjacent its lower end, and having another inlet port arranged adjacent its upper end, said casing also having a discharge port arranged adjacent its lower end, valve means for controlling said lower inlet ports, a thermostat arranged between said discharge port and said upper inlet port, and adapted to operate said valve means.

In testimony whereof, I affix my signature in the presence of two witnesses.

CHESTER F. JOHNSON.

Witnesses:
C. B. ELDREDGE,
F. L. DAVIS.